United States Patent
Aidasani et al.

(10) Patent No.: US 9,984,362 B2
(45) Date of Patent: May 29, 2018

(54) SYSTEMS AND METHODS FOR GESTURE-BASED INTERACTION WITH COMPUTER SYSTEMS

(75) Inventors: Dilip Aidasani, Brooklyn, NY (US); Kimberly Alderfer, Newtown, PA (US); Kate T. King, Scottsdale, AZ (US); Lisa Knight, New York, NY (US); Stuart Rolinson, Cave Creek, AZ (US)

(73) Assignee: Liberty Peak Ventures, LLC, Plano, TX (US)

( * ) Notice: Subject to any disclaimer, the term of this patent is extended or adjusted under 35 U.S.C. 154(b) by 0 days. days.

(21) Appl. No.: 13/619,391

(22) Filed: Sep. 14, 2012

(65) Prior Publication Data

US 2013/0008948 A1 Jan. 10, 2013

Related U.S. Application Data (63) Continuation of application No. 13/168,850, filed on Jun. 24, 2011, which is a continuation of application No. 13/168,072, filed on Jun. 24, 2011, now Pat. No. 8,172,135.

(51) Int. Cl.
G06Q 20/00 (2012.01)
G06Q 40/00 (2012.01)
G06Q 20/32 (2012.01)
G06Q 20/40 (2012.01)

(52) U.S. Cl.
CPC ..... G06Q 20/3223 (2013.01); G06Q 20/4012 (2013.01)

(58) Field of Classification Search
CPC ........ G06F 17/60; G06Q 20/00; G06Q 40/00; G06Q 20/02
USPC .......................................................... 705/44
See application file for complete search history.

(56) References Cited

U.S. PATENT DOCUMENTS

| | | | |
|---|---|---|---|
| 6,075,895 A | 6/2000 | Qiao et al. | |
| 6,098,053 A | 8/2000 | Slater | |
| 6,421,453 B1 | 7/2002 | Kanevsky et al. | |
| 6,509,707 B2 | 1/2003 | Yamashita et al. | |
| 6,533,168 B1 | 3/2003 | Ching | |
| 6,726,094 B1 * | 4/2004 | Rantze | G06Q 20/20 235/379 |
| 6,788,809 B1 | 9/2004 | Grzeszczuk et al. | |
| 7,308,112 B2 | 12/2007 | Fujimura et al. | |
| 7,365,735 B2 | 4/2008 | Reinhardt et al. | |

(Continued)

FOREIGN PATENT DOCUMENTS

WO 2007033358 3/2007

OTHER PUBLICATIONS

USPTO; Office Action dated Nov. 22, 2011 in U.S. Appl. No. 13/168,072.

(Continued)

*Primary Examiner* — Clifford Madamba
(74) *Attorney, Agent, or Firm* — Ascenda Law Group, PC (57) ABSTRACT

The present disclosure facilitates gesture-based interaction with a computer-system. The method may comprise pairing a transaction account with a likeness, receiving the likeness and a transaction request based upon the location of a marker in three dimensional space, retrieving the transaction account paired with the likeness, and approving the transaction request at least partially based upon the transaction account and the likeness.

20 Claims, 6 Drawing Sheets

(56) References Cited

U.S. PATENT DOCUMENTS

| | | | |
|---|---|---|---|
| 7,365,737 B2 | 4/2008 | Marvit et al. | |
| 7,394,346 B2 * | 7/2008 | Bodin | 340/5.51 |
| 7,595,816 B1 | 9/2009 | Enright et al. | |
| 7,746,215 B1 | 6/2010 | Bishop | |
| 7,775,440 B2 | 8/2010 | Silverbrook et al. | |
| 7,894,634 B2 | 2/2011 | Chung | |
| 7,971,784 B2 | 7/2011 | Lapstun et al. | |
| 8,028,896 B2 * | 10/2011 | Carter et al. | 235/379 |
| 8,172,135 B1 | 5/2012 | Aidasani et al. | |
| 8,181,858 B2 | 5/2012 | Carter et al. | |
| 8,245,919 B1 | 8/2012 | Aidasani et al. | |
| 8,468,584 B1 | 6/2013 | Hansen | |
| 2003/0132974 A1 | 7/2003 | Bodin | |
| 2004/0078329 A1 | 4/2004 | Kight et al. | |
| 2004/0093308 A1 | 5/2004 | Kawashima et al. | |
| 2005/0044042 A1 | 2/2005 | Mendiola et al. | |
| 2005/0097320 A1 | 5/2005 | Golan et al. | |
| 2005/0165667 A1 * | 7/2005 | Cox | G06Q 20/10 705/35 |
| 2005/0171776 A1 | 8/2005 | Kojima et al. | |
| 2006/0094399 A1 | 5/2006 | Dupont | |
| 2006/0144946 A1 | 7/2006 | Kuriyama et al. | |
| 2006/0200480 A1 | 9/2006 | Harris et al. | |
| 2006/0215821 A1 | 9/2006 | Rokusek et al. | |
| 2007/0055630 A1 | 3/2007 | Gauthier et al. | |
| 2007/0075968 A1 | 4/2007 | Hall et al. | |
| 2007/0152035 A1 | 7/2007 | Adams et al. | |
| 2007/0252898 A1 | 11/2007 | Delean | |
| 2008/0000117 A1 | 1/2008 | Marshall et al. | |
| 2008/0222048 A1 | 9/2008 | Higgins et al. | |
| 2009/0006646 A1 | 1/2009 | Duarte | |
| 2009/0108057 A1 | 4/2009 | Mu et al. | |
| 2009/0265671 A1 | 10/2009 | Sachs et al. | |
| 2010/0008535 A1 | 1/2010 | Abulafia et al. | |
| 2010/0111377 A1 | 5/2010 | Monroe | |
| 2010/0121725 A1 | 5/2010 | Adams et al. | |
| 2010/0131273 A1 | 5/2010 | Aley-Raz et al. | |
| 2010/0198733 A1 * | 8/2010 | Gantman | G06Q 20/02 705/75 |
| 2010/0203870 A1 | 8/2010 | Hubinak et al. | |
| 2010/0216396 A1 | 8/2010 | Fernandez et al. | |
| 2011/0093821 A1 | 4/2011 | Wigdor et al. | |
| 2011/0098023 A1 | 4/2011 | Hammad | |
| 2011/0112920 A1 | 5/2011 | Mestre et al. | |
| 2011/0155800 A1 | 6/2011 | Mastrangelo et al. | |
| 2011/0161229 A1 | 6/2011 | Mastrangelo et al. | |
| 2011/0166997 A1 | 7/2011 | Dixon et al. | |
| 2011/0184821 A1 | 7/2011 | Mon et al. | |
| 2011/0184867 A1 | 7/2011 | Varadarajan | |
| 2011/0199389 A1 | 8/2011 | Lu et al. | |
| 2011/0220718 A1 | 9/2011 | Dixon et al. | |
| 2011/0251892 A1 | 10/2011 | Laracey | |
| 2011/0251954 A1 * | 10/2011 | Chin | G06F 3/04883 705/40 |
| 2011/0263292 A1 | 10/2011 | Phillips | |
| 2011/0270757 A1 | 11/2011 | Hammad | |
| 2011/0282785 A1 | 11/2011 | Chin | |
| 2012/0030195 A1 | 2/2012 | Holt et al. | |
| 2012/0151380 A1 | 6/2012 | Bishop | |
| 2012/0158528 A1 | 6/2012 | Hsu et al. | |
| 2012/0166314 A1 | 6/2012 | Kimberg | |
| 2012/0173325 A1 | 7/2012 | Johri | |
| 2012/0200389 A1 | 8/2012 | Solomon | |
| 2012/0203666 A1 | 8/2012 | Torossian et al. | |
| 2012/0280040 A1 | 11/2012 | Carney et al. | |
| 2012/0307109 A1 | 12/2012 | Morioka et al. | |

OTHER PUBLICATIONS

USPTO; Notice of Allowance dated Mar. 2, 2012 in U.S. Appl. No. 13/168,072.
USPTO; Office Action dated Jan. 5, 2012 in U.S. Appl. No. 13/168,835.
USPTO; Notice of Allowance dated Feb. 15, 2012 in U.S. Appl. No. 13/168,835.
USPTO; Office Action dated Nov. 22, 2011 in U.S. Appl. No. 13/168,830.
USPTO; Notice of Allowance dated Mar. 8, 2012 in U.S. Appl. No. 13/168,830.
USPTO; Office Action dated Nov. 22, 2011 in U.S. Appl. No. 13/168,837.
USPTO; Notice of Allowance dated Feb. 13, 2012 in U.S. Appl. No. 13/168,837.
USPTO; Office Action dated Nov. 29, 2011 in U.S. Appl. No. 13/168,843.
USPTO; Notice of Allowance dated Feb. 13, 2012 in U.S. Appl. No. 13/168,843.
USPTO; Office Action dated Jun. 28, 2012 in U.S. Appl. No. 13/168,807.
USPTO; Office Action dated Jun. 10, 2012 in U.S. Appl. No. 13/168,829.
USPTO; Office Action dated Aug. 30, 2012 in U.S. Appl. No. 13/168,850.
Perez, Cardio Lets You Pay on Mobile by Holding a Credit Card Up to the Phone, pp. 1-2, www.readwriteweb.com, Jun. 23, 2011.
Perez, Taking on Rival Jumio, Payments Startup Card.io Adds Web Suuport, pp. 1-2, www.techcrunch.com, Mar. 22, 2012.
card.io—How it works, 1 page, www.card.io, 2012.
Final Office Action dated Nov. 30, 2012 in U.S. Appl. No. 13/168,829.
Final Office Action dated Dec. 14, 2012 in U.S. Appl. No. 13/168,807.
Final Office Action dated Dec. 20, 2012 in U.S. Appl. No. 13/168,960.
Office Action dated Jan. 29, 2013 in U.S. Appl. No. 13/168,823.
Advisory Action dated Feb. 11, 2013 in U.S. Appl. No. 13/168,829.
Advisory Action dated Feb. 13, 2013 in U.S. Appl. No. 13/168,807.
Office Action dated Feb. 14, 2013 in U.S. Appl. No. 13/619,131.
Office Action dated Jun. 8, 2012 in U.S. Appl. No. 12/343,178.
Office Action dated Dec. 5, 2012 in U.S. Appl. No. 13/280,938.
Office Action dated Dec. 24, 2012 in U.S. Appl. No. 12/343,178.
Final Office Action dated Mar. 29, 2013 in U.S. Appl. No. 13/280,938.
Final Office Action dated Jun. 11, 2013 in U.S. Appl. No. 13/619,131.
Office Action dated Apr. 26, 2013 in U.S. Appl. No. 13/168,850.
Office Action dated May 26, 2011 in U.S. Appl. No. 12/343,178.
Advisory Action dated Mar. 1, 2013 in U.S. Appl. No. 13/168,850.
Final Office Action dated Apr. 26, 2013 in U.S. Appl. No. 13/168,823.
Notice of Allowance dated May 10, 2013 in U.S. Appl. No. 13/168,829.
Office Action dated May 10, 2013 in U.S. Appl. No. 13/168,827.
Advisory Action dated Aug. 22, 2013 in U.S. Appl. No. 13/619,131.
Final Office Action dated Aug. 23, 2013 in U.S. Appl. No. 13/168,827.
Office Action dated Aug. 27, 2013 in U.S. Appl. No. 13/215,115.
Office Action dated Sep. 6, 2013 in U.S. Appl. No. 13/619,131.
Office Action dated Sep. 9, 2013 in U.S. Appl. No. 13/168,807.
Office Action dated Sep. 17, 2013 in U.S. Appl. No. 13/168,850.
Notice of Allowance dated Sep. 23, 2013 in U.S. Appl. No. 13/619,131.
Advisory Action dated Oct. 25, 2013 in U.S. Appl. No. 13/168,827.
Final Office Action dated Dec. 23, 2013 in U.S. Appl. No. 13/215,115.
Final Office Action dated Jan. 16, 2014 in U.S. Appl. No. 13/280,938.
Advisory Action dated Jun. 27, 2013 in U.S. Appl. No. 13/168,823.
Office Action dated Jun. 27, 2013 in U.S. Appl. No. 13/280,938.

* cited by examiner

SYSTEMS AND METHODS FOR GESTURE-BASED INTERACTION WITH COMPUTER SYSTEMS

CROSS REFERENCE TO RELATED APPLICATIONS

This application is a continuation of, claims priority to and the benefit of U.S. Ser. No. 13/168,850, filed on Jun. 24, 2011 and entitled "SYSTEMS AND METHODS FOR GESTURE-BASED INTERACTION WITH COMPUTER SYSTEMS." The '850 application is a continuation of claims priority to and the benefit of, U.S. Pat. No. 8,172,135 issued on May 8, 2012 (aka U.S. Ser. No. 13/168,072 filed on Jun. 24, 2011) and entitled "SYSTEMS AND METHODS FOR GESTURE-BASED INTERACTION WITH COMPUTER SYSTEMS." All of which are incorporated by reference herein in their entirety.

BACKGROUND

Field

The present disclosure generally relates to facilitating gesture-based interaction with computer systems.

Related Art

Two main techniques for interacting with one's personal computer currently exist. Namely, (1) via one's keyboard, and (2) via one's mouse. This is the state of the art, despite the availability of a variety of other potential sources of interaction. For example, most modern personal computers (not to mention automatic teller machines (ATMs), kiosks, etc.) are equipped with cameras able to record live video. Personal computers, for example, are increasingly equipped with web-cams.

However, where computers are equipped with such devices, they are mainly included for the purposes of facilitating secure login and enabling video conferencing (e.g., via Skype™). Of course, infrared (e.g., Nintendo WHO) and image based (e.g., Microsoft Kinect®) devices exist. However, such devices are, at present, intended for use with video games. More importantly, such systems are not intended, and do not, facilitate secure gesture-based interaction in a virtual environment. Rather, existing devices merely translate the motions of an object (e.g., a Wii® controller or a human body) into the virtual space. These motions are not translated into the virtual space securely, nor are such systems helpful in authenticating a user to the virtual space.

Therefore, what is needed is a system that permits a more robust interaction with a personal computing device that is, a system that broadens human-computer interaction beyond the constraints imposed by keyboard and mouse. This system should facilitate a secure connection to the virtual space.

SUMMARY

The present disclosure includes a system, method, and article for facilitating gesture-based interaction with a computer-system. The method may comprise pairing a transaction account with a likeness, receiving the likeness and a transaction request based upon the location of a marker in three dimensional space, retrieving the transaction account paired with the likeness, and approving the transaction request based upon the transaction account and the likeness.

The marker may comprise at least one of: a transaction instrument and a mobile communication device. The mobile communication device may display at least one of: an image of a transaction instrument, a transaction account identifier, a QR code, and a bar code. The system may also pair a marker with the transaction account, and/or pair at least one of: a personal identification number (PIN), a digital signature, and a secret gesture with the transaction account. The system may approve the transaction request based upon the transaction account and one of: a personal identification number (PIN), a digital signature, and a secret gesture.

The system may also receive data associated with a digital scan of a likeness; and transmit an offer to a client based upon the data. In an embodiment, the system may receive at least one of a secret gesture, a digital signature, and a personal identification number (PIN); and transmit an offer to a client based upon the at least one of the secret gesture, the digital signature, and the PIN.

BRIEF DESCRIPTION OF THE DRAWINGS

The features and advantages of the present disclosure will become more apparent from the detailed description set forth below when taken in conjunction with the drawings, wherein like numbers refer to like elements.

DETAILED DESCRIPTION

The detailed description of exemplary embodiments herein makes reference to the accompanying drawings, which show the exemplary embodiments by way of illustration and their best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment. As used herein, terms similar to "match" may include a full or partial match, or a match based on certain rules or criteria.

Phrases and terms similar to "financial institution," "transaction account issuer," and "payment processor" may include any person, entity, software and/or hardware that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "business", "merchant", "supplier" or "seller" may be used interchangeably with each other and shall mean any person, entity, distributor system, software and/or hardware that is a provider, broker and/or any other entity in the distribution chain of goods or services and/or that receives payment or other consideration. For example, a merchant may be a grocery store, a retail store, a travel agency, a service provider, an on-line merchant or the like. For example, a supplier may request payment for goods sold to a buyer who holds an account with a transaction account issuer.

The terms "payment vehicle," "financial transaction instrument," "transaction instrument," "transaction account product" and/or the plural form of these terms may be used interchangeably throughout to refer to a financial instrument. As used herein, an account code may or may not be associated with a physical financial instrument.

Phrases and terms similar to a "buyer," "consumer," and "user" may include any person, entity, software and/or hardware that receives items in exchange for consideration (e.g. financial payment). For example, a buyer may purchase, lease, rent, barter or otherwise obtain items from a supplier and pay the supplier using a transaction account.

Phrases and terms similar to an "item" may include any good, service, information, experience, reward, points, coupons, credits, monetary equivalent, anything of value, something of minimal or no value, etc.

As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

Phrases or terms similar to a "processor" (such as a payment processor) may include a company (e.g., a third party) appointed (e.g., by a merchant) to handle transactions for merchant banks. Processors may be broken down into two types: front-end and back-end. Front-end processors have connections to various transaction accounts and supply authorization and settlement services to the merchant banks' merchants. Back-end processors accept settlements from front-end processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases or terms similar to a "payment gateway," "gateway," or "mobile gateway" may include an application service provider that authorizes payments for e-businesses, online retailers, and/or traditional brick and mortar merchants. A payment gateway may protect transaction account details by encrypting sensitive information, such as transaction account numbers, to ensure that information passes securely between the customer and the merchant and also between merchant and payment processor.

As used herein, "transmit" may include sending electronic data from one system component to another over a network connection. Additionally, as used herein, "data" may include encompassing information such as commands, queries, files, data for storage, and the like in digital or any other form.

Phrases or terms similar to "transaction account" may include any account that may be used to facilitate a financial transaction, A "transaction account" as used herein refers to an account associated with an open account or a closed account system (as described herein). The transaction account may exist in a physical or non-physical embodiment. For example, a transaction account may be distributed in non-physical embodiments such as an account number, frequent-flyer account, and telephone calling account or the like. Furthermore, a physical embodiment of a transaction account may be distributed as a financial instrument.

In general, transaction accounts may be used for transactions between the user and merchant through any suitable communication means, such as, for example, a telephone network, intranet, the global, public Internet, a point of interaction device (e.g., a point of sale (POS) device, personal digital assistant (PDA), mobile telephone, kiosk, etc.), online communications, off-line communications, wireless communications, and/or the like.

An "account", "account code", or "account number", as used herein, may include any device, code, number, letter, symbol, digital certificate, smart chip, digital signal, analog signal, biometric or other identifier/indicia suitably configured to allow the consumer to access, interact with or communicate with the system (e.g., one or more of an authorization/access code, personal identification number (PIN), Internet code, other identification code, and/or the like). The account number may optionally be located on or associated with a rewards card, charge card, credit card, debit card, prepaid card, telephone card, embossed card, smart card, magnetic stripe card, bar code card, transponder, radio frequency card or an associated account. The system may include or interface with any of the foregoing cards or devices, or a transponder and RFID reader in RF communication with the transponder (which may include a fob). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

The account code may be distributed and stored in any form of plastic, electronic, magnetic, radio frequency, wireless, audio and/or optical device capable of transmitting or downloading data from itself to a second device. A customer account code may be, for example, a sixteen-digit transaction account code, although each transaction account provider has its own numbering system, such as the fifteen-digit numbering system used by American Express. Each company's transaction account codes comply with that company's standardized format such that the company using a fifteen-digit format will generally use three-spaced sets of numbers, as represented by the number "0000 000000 00000". The first five to seven digits are reserved for processing purposes and identify the issuing bank, card type, etc. In this example, the last (fifteenth) digit is used as a sum check for the fifteen digit number. The intermediary eight-to-eleven digits are used to uniquely identify the customer. A merchant account code may be, for example, any number or alpha-numeric characters that identify a particular merchant for purposes of card acceptance, account reconciliation, reporting, or the like.

It should be noted that the transfer of information in accordance with the present disclosure, may be completed in a format recognizable by a merchant system or account issuer. In that regard, by way of example, the information may be transmitted from an RFID device to an RFID reader or from the RFID reader to the merchant system in magnetic stripe or multi-track magnetic stripe format.

Figure 1:
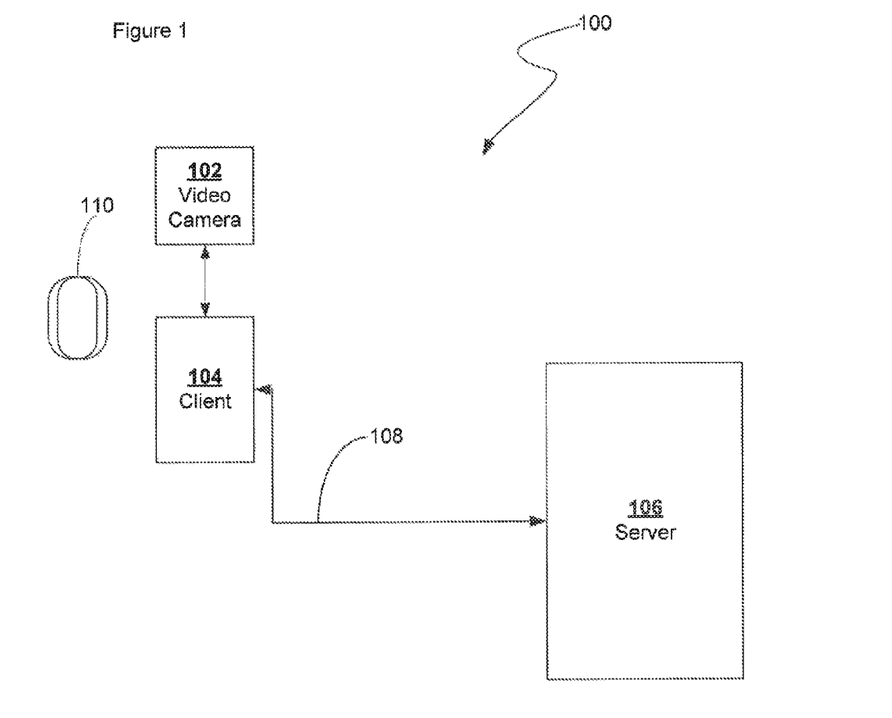
FIG. 1 shows an exemplary system diagram, in accordance with an embodiment.

With reference to FIG. 1, system 100 implements a gesture-based method. System 100 may include a camera 102, a client 104, a server system 106, and a network 108. System 100 may include a variety of other components, including for example, one or more mobile gateway servers (not shown) for securely receiving and transmitting data to and from the client 102, one or more electronic commerce website servers (not shown), and/or one or more payment processor authorization gateway servers (not shown).

Camera 102 may comprise any software and/or hardware suitably configured for acquiring data (e.g., one or more digital and/or analog images). Thus, camera 102 may comprise a digital camera, a digital video camera (e.g., a web-cam), an analog camera, an analog video camera, an infrared (IR) imaging device, a radar or sonar imaging device, a laser imaging device, and/or a radio frequency imaging device.

Client 104 may comprise any software and/or hardware suitably configured for sending and/or receiving data. Client 104 may include a personal computer such as a desktop, laptop computer, an iPad®, iMAC®, MacBook®, and/or any of a wide array of personal computing products. Client 104 may further comprise a kiosk, a terminal, a point of sale (POS) device, a television, a digital sign or banner, or any other device capable of sending and/or receiving data over a network. In an embodiment, client 104 may run Microsoft Internet Explorer, Mozilla Google Chrome, Apple Safari, or any other of the myriad software packages available for browsing the internet. Client 104 may further comprise a display, such as a liquid crystal display (LCD), or a plasma screen display. Client 104 may further comprise a digital sign or kiosk, such as a merchant digital sign or kiosk and/or a digital sign or kiosk such as one may encounter in a shopping mall and which is configured or configurable to display offers, advertisements, mall directories, and the like.

Server system 106 may comprise software and/or hardware suitably configured or configurable to receive and/or process data. Thus, server system 106 may comprise a rack mountable server appliance running a suitable server operating system (e.g., IIS) and having database software (e.g., Oracle) installed thereon. In addition, server system 106 may, in some embodiments, include one or more mobile gateway servers (not shown) for securely receiving and transmitting data to and from the client 104.

Network 108 may comprise software and/or hardware suitably configured or configurable to facilitate the transmission and reception of data. Thus, network 108 may comprise any of a variety of wired and/or wireless network architectures, including, for example, an RF network architecture such as a network associated with a wireless provider (e.g., a 3G or 4G network), a Wi-Fi network architecture (e.g., a home area or local area network), and/or a wired network architecture reliant upon one or more cables and/or trunk lines and/or optical fiber lines. Network 108 may comprise a combination of wired and wireless network types, Network 108 may further comprise any of a variety of network types, including a public network type, such as a "cloud" computing environment, like the Internet, a proprietary network, and/or a combination of both public and private network types.

Mobile device 110 may comprise any software and/or hardware configured or configurable to display an image. Mobile device 110 may comprise a personal digital assistant ("PDA"), a smart phone (e.g., an iPhone®, a Blackberry®, and the like), a cellular phone having a display, and/or any other similar device.

Referring now to FIGS. 2-6, the process flows and screenshots depicted are merely embodiments and are not intended to limit the scope of the invention as described herein. For example, the steps recited in any of the method or process descriptions may be executed in any order and are not limited to the order presented. It will be appreciated that the following description makes appropriate references not only to the steps and user interface elements depicted in FIGS. 2-6, but also to the various system components as described above with reference to FIG. 1.

Figure 2:
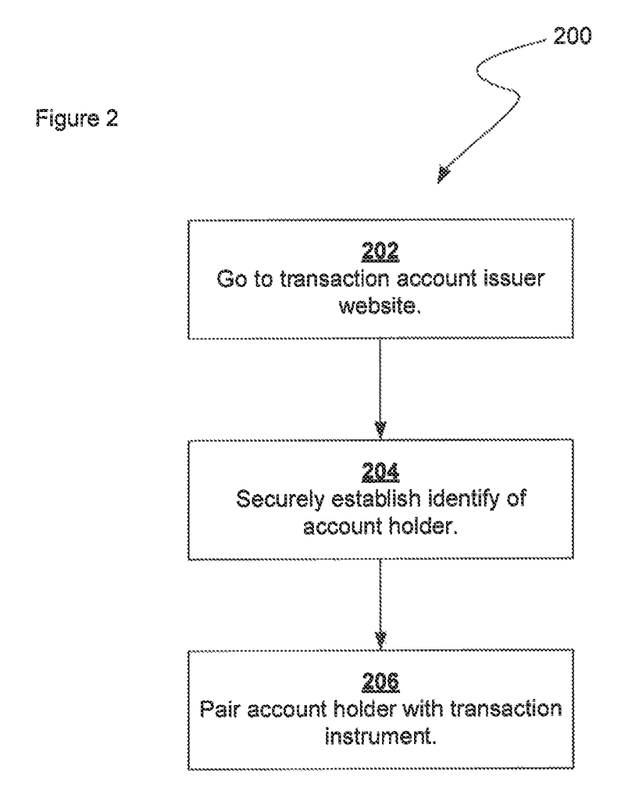
FIG. 2 shows a flowchart depicting an exemplary method for pairing in gesture-based systems, in accordance with an embodiment.

With reference to FIG. 2, a transaction account activation process 200 is described. The transaction account activation process 200 may enable or facilitate certain of the gesture based methods described below. Accordingly, in an embodiment, an individual who has been approved for a new transaction account may visit by way of client 104 a transaction account issuer website (step 202). Server system 106 may generate, or facilitate the generation of, such a website, and client 104 may display the website. Website generation and display is very well known in the art and will not be described in greater detail here.

With continuing attention to FIG. 2, the individual, having gained access to the website, may securely establish, or verify, his identity (step 204) prior to activation of his account. An individual may verify his identity using a variety of methods. For example, an individual may hold a form of identification (ID) (such as his driver's license, passport, social security card, birth certificate, and/or any combination of these) such that an image of the ID is acquired or captured by camera 102.

An individual may also hold his likeness (e.g., transaction instrument and/or his mobile device 110) in view of camera 102. An individual's mobile device 110 and/or transaction instrument may display a variety of information, including an account code, a name, an expiration date, a quick response code ("QR code"), a bar code, and/or any other information that may be used to identify a transaction account and/or transaction instrument. Where an individual's mobile device 110 is used, a transaction account issuer may not be required to issue a plastic or tangible transaction instrument; this may save a transaction account issuer the substantial expense associated with issuing new and replacement tangible transaction instruments. Further, where a QR code, bar code, and/or other form of encoded data are used, the security of an individual's transaction account may be improved. That is, encoded data is much more difficult to memorize and/or copy than, for example, a simple account code. Thus, in an embodiment, an individual's transaction account may be protected by an encoded account identifier.

An individual's likeness may comprise any feature of the individual, data associated with the individual, biometric information, or any other information or device (transaction device, mobile device, etc) tending to identify the individual. For example, an individual's likeness may comprise his facial patterns and/or characteristics. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

A biometric security system may include, a biometric sensor that detects biometric samples and a device for verifying biometric samples. The biometric security system may be configured with one or more biometric scanners, processors and/or systems. The biometric system may include one or more technologies, or any portion thereof, that facilitates recognition of a biometric. For example, camera 102 (or another biometric reader, not shown) may scan or capture data and/or an image of the objects/likenesses presented. The captured image may be communicated to client 104 via a wired or wireless connection between the devices. Client 104 may communicate the captured image to server system 106 by way of network 108.

In an embodiment, server system 106 may communicate with an intelligence agency and/or government system (e.g., a police department system and/or department of motor vehicles (DMV) system) and/or another third party identity verification system (e.g., Experian®, TransUnion®, Equifax®, etc.) to verify that the captured image of the identification represents a valid identification. Server system 106 may further verify the individual's identity based upon a comparison of the individual's likeness to the image (or another biometric identifier) of the individual associated with the identification, if the individual's likeness matches an image or likeness associated with the identification, the individual's identity may be verified.

In an embodiment, camera 102 may transmit the captured image to server system 106, which may verify the individual's identity based upon one or more responses by the individual to "secret" questions, the answers to which the individual may have established during an account application process. In an embodiment, secret questions may be related to an individual's personal information, such as, for example, the individual's social security number or telephone number. Thus, server system 106 may use the captured image of the individual's transaction instrument, likeness, etc. to look up the individual's personal information (which the individual supplied during the account application process), and if the individual's responses to the secret questions are correct, the individual's identity may be satisfactorily verified, in an embodiment, an individual may simply enter an identifier associated with his transaction instrument by way of a keyboard (not shown) associated with client 104. If the individual's answers to the secret questions match the answers entered by the individual during the application process, the individual's identity may be satisfactorily verified, and the individual's account activated.

An individual may further associate or "pair" his likeness and/or a personal identification number (PIN), a digital signature, and/or a "secret" gesture with his transaction instrument and/or transaction account (step 206). As used herein, an individual's PIN, digital signature, and/or secret gesture may comprise "identifying information." Likeness, as used herein, may comprise a biometric (as described above). An individual's likeness and/or identifying information may be paired before or after an individual has verified his identity. An individual may present to camera 102 his likeness. Where an individual's likeness cannot be captured with camera 102, the individual may present his likeness to any device capable of capturing and/or recording the likeness, e.g., a microphone (not shown) (for example, where the individual's likeness comprises a voiceprint), or any other type of biometric reader (e.g., a heartbeat sensor, fingerprint reader, or retinal scanner). An individual may further enter at client 104 a PIN, a digital signature, and/or a "secret" gesture, and each of these may be associated, or "paired," by server system 106 with the individual's transaction account. In an example, a digital signature may comprise a signature entered at client 104 via an electronic signature pad or by moving a marker (see below) in the visual field of camera 102, as described below. A digital signature may further comprise an individual's name, initials, and/or any other spelling or shape that an individual wishes to select for himself. A secret gesture may comprise a gesture, motion, or series of motions known only to an individual (e.g., a "star" shape). A secret gesture may be entered by moving a marker in the visual field of camera 102, again, as described below.

Accordingly, server system 106 may pair a likeness and/or identifying information with an individual's transaction instrument and/or transaction account by storing a record of some or all of the individual's identifying information in a database (not shown) in association with an identifier associated with the individual's transaction instrument and/or an identifier associated with the individual's transaction account. The identifier associated with an individual's transaction instrument and/or transaction account may comprise and account code (see above), a QR code, a bar code, an image of the transaction instrument, and/or a combination of one or more of these. Thus, in simpler terms, server system 106 may record a data set comprising an identifier associated with an individual's transaction instrument and/or account and an individual's identifying information and/or likeness. In this way, an individual may be paired securely through his likeness and/or identifying information with his transaction instrument and/or account.

Figure 3:
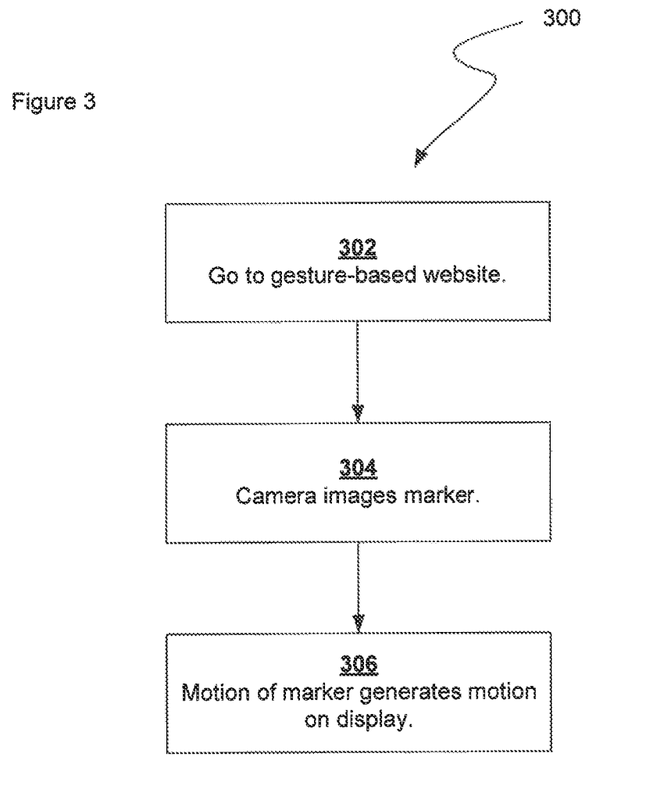
FIG. 3 shows a flowchart depicting an exemplary method for interacting with gesture based systems, in accordance with an embodiment.

With reference now to FIG. 3, a process 300 whereby an individual may interact with a gesture-based system 100 via client 104 is described. In an embodiment, an individual may visit or "surf" to a gesture-based website (step 302) using client 104. In an embodiment, an individual may interact with a gesture-based application or program installed (as software or hardware) on client 104. An individual may interact with a gesture-based system 100 by holding a marker in view of camera 102. A marker may comprise, but is not limited to, a transaction instrument, and/or a mobile device 110 displaying a transaction instrument and/or transaction account information and/or an image. A marker may further comprise any object (e.g., a pen, pencil, hand, finger, and the like) that may be imaged by camera 102 (step 304).

Camera 102 may transmit, in real time or pseudo-real time (i.e., real time delayed by a processing interval), the image, and/or coordinates associated with the image, of the marker to client 106. Client 106 may, in turn, transmit the image and/or coordinates associated with the image to server system 106. In an embodiment, client 106 may process the motion of the marker in real time or pseudo-real time. Based upon the motion of the marker, client 106 may display an icon (e.g., a cursor), and the icon may move in real time or pseudo-real time in a motion corresponding or closely corresponding to the motion of the marker in space (step 306). In an embodiment, server system 106 may process the motion of the marker, in which case server 102 may instruct client 106 as to the proper motion of the icon. In both instances, the motion of the icon on the display of client 106 corresponds or closely corresponds to the motion of the marker in space (step 306). Thus, an individual may forgo his mouse (and potentially his keyboard) in favor of a marker. The individual may navigate a website by moving his marker in view of camera 102. As the individual's marker changes position in space, the icon displayed for the individual on the display of client 106 also moves. Thus, the individual is able to navigate a gesture-based website. An individual's marker may move in two dimensions and/or three dimensions, and the motion of the marker may be translated to two dimensional motion of an icon displayed by client 106. Similarly, the motion of the marker (again, in two dimensions or three dimensions) may be translated to apparent three dimensional motion of an icon displayed by client 106. Apparent three dimensional motion may comprise motion that appears three dimensional, although it may occur on a two dimensional display, for example, by rendering the icon such that it appears to move in three dimensions.

Figure 4:
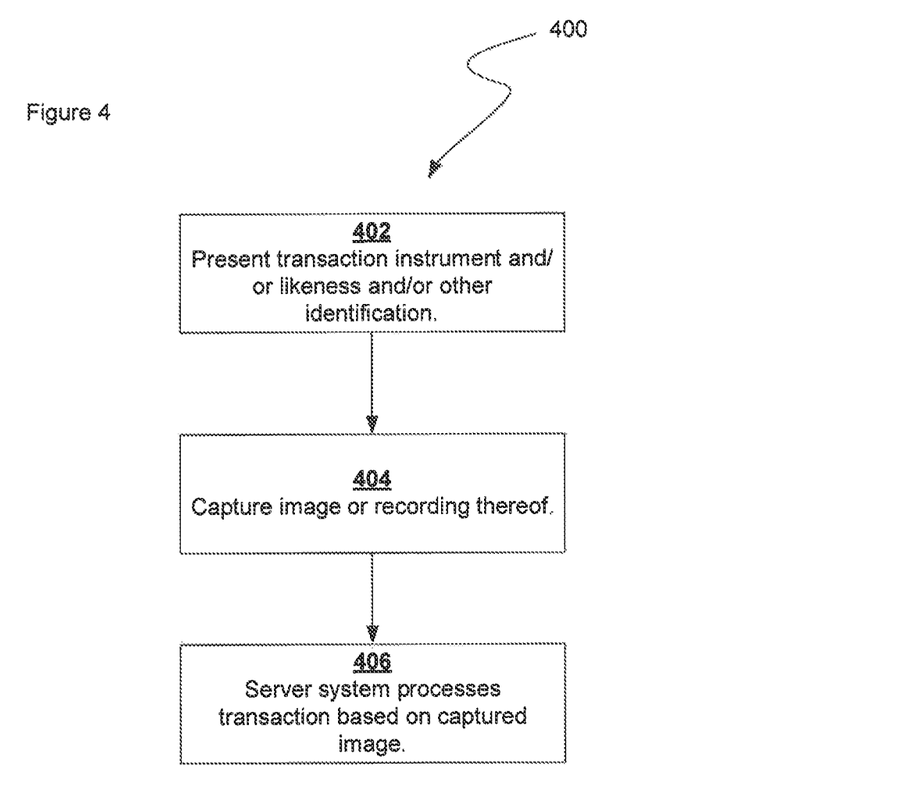
FIG. 4 shows a flowchart depicting an exemplary method for making a purchase using gesture-based systems, in accordance with an embodiment.

With reference to FIG. 4, a process 400 for logging into and/or completing a purchase via a gesture-based system 100 is described. To log into a gesture based system 100 and/or initiate a purchase by way of a gesture-based system 100, an individual may make a transaction request. Thus, a transaction request may indicate that an individual wishes to conduct a transaction (e.g., "checkout" or otherwise make a purchase). A transaction request may also indicate that an individual wishes to log into a system gesture based system 100). In an embodiment, an individual may review the details of his transaction account (e.g., balance, amount due, date due, remittances, and the like) by way of a gesture based system 100.

An individual may accomplish or make a transaction request by moving his marker such that the icon displayed by client 104 moves "over" a "checkout," "pay now," "log in," "sign in" or similar option displayed by his client 104. To be more specific, an individual may position his marker in three dimensional space (e.g., using his hand) such that one or more of the coordinates associated with the icon are in a range of coordinates that define the boundaries of the desired option displayed by client 104. An individual may select the option by shaking or tapping his marker in space, but of course, a variety of "double clicking" (i.e., twice or double pulsating) or similar motions signifying a desire to make a selection are within the scope of the present disclosure. A transaction request may be transmitted to server system 106 from client 104 as html or other web-based code, and server 106 may receive a transaction request by way of a secure (e.g., encrypted) or non-secure (e.g., unencrypted) connection.

In response to receiving a transaction request, client 104 and/or server 106 may prompt an individual to present his transaction instrument, his likeness and/or identifying information (step 402), and/or his mobile device 110 to camera 102 (or other biometric reader or data input device). For example, in an embodiment, an individual may be prompted by client 104 or server system 106 through client 106 to present both his transaction instrument as well as his likeness (e.g., his face) to camera 102 (and/or other card and/or other biometric reader). Camera 102 may capture an image of the individual's transaction instrument (whether it be tangible or displayed by mobile device 110) and likeness (step 404). Camera 102 may further transmit the captured image to client 104, which may convey the captured image to server system 106. Server system 106 may process or facilitate the processing of the requested transaction (step 406). For example, server system 106 may compare the captured image to a saved image of the individual's likeness and/or the individual's transaction instrument. Specifically, server system 106 may receive an identifier (e.g., an account code, QR code, and the like, as described more fully above) associated with the image of the individual's transaction instrument, where the identifier enables server system 106 to look up or otherwise retrieve the individual's paired transaction account. Having retrieved the individual's transaction account, server system 106 may further look up or retrieve a paired image of the individual's likeness, saved, for example, in a secure database coupled to server system 106. Server system 106 may compare the captured image of the individual's likeness to the saved/paired likeness, the results of which may be used to authenticate the individual to his transaction account and/or approve or deny the requested transaction.

Thus, for example, where the captured likeness of the individual matches the paired likeness, the individual may be authenticated to his transaction account, and the requested transaction may be approved. On the other hand, where the captured image does not match, or matches insufficiently, the individual may not be authenticated to his transaction account, and the requested transaction may be denied to prevent fraud on the merchant, transaction account issuer, and/or the individual. Server system 106 may transmit to client 104 an authentication response to client 104. An authentication response may comprise any signal, message, instruction, set of messages or instructions and the like indicating that an individual has been authenticated or that an individual has not been authenticated. Thus, in an embodiment, an authentication response may indicate that an individual has been successfully authenticated and/or that a requested authentication has failed.

In an embodiment, an individual may not be required to present his transaction instrument for image capture. Rather, an individual may simply present his likeness for capture (step 402). In this regard, an individual may be authenticated based upon a single-factor (i.e., his likeness). In contrast, foregoing embodiments may require two-factor authentication, in which an individual is authenticated based upon a first factor (e.g., his likeness) as well as a second factor (e.g., an image of his transaction instrument, etc.) Based upon the individual's likeness, server system 106 may initiate a facial recognition (or other biometric authentication) process, whereby a database of saved valid (and perhaps even invalid) likenesses are compared to the likeness presented by the individual (steps 404 and 406). If a valid likeness matching the individual's likeness is returned or detected by the facial recognition (or other biometric authentication) process, the individual may be authenticated to his transaction account and the transaction account that is paired to the individual's likeness may be used to process the requested transaction (step 406). Thus, an individual may make a purchase, log in to his transaction account, and the like using the systems and methods disclosed herein simply by presenting his likeness to system 100.

In an embodiment, an individual may be authenticated to his transaction account based upon an image of his likeness and at least one of the data comprising his identifying information (i.e., his PIN, digital signature, and/or secret gesture). Thus, in an embodiment, an individual may not be required to present his transaction instrument (nor enter an account code) in order to be authenticated to his transaction account. Rather, an individual may present his likeness to camera 102 as described above in addition to at least one of his PIN, digital signature, and secret gesture. Having acquired each of these two authentication factors, server 106 may authenticate an individual to his transaction account.

As used herein, the term "enter" may be used interchangeably with the term "present," although, in general, the term "present" may be used to refer to image/biometric capture or presentation of an image/biometric or object to camera 102, while the term "enter" may be used to refer to other non-biometric input techniques (e.g., mice, keyboards, etc.) In an exemplary embodiment, then, an individual may present his likeness as well as his secret gesture to camera 102. Server system 106 may retrieve the individual's saved identifying information based upon the likeness presented by the individual (i.e., by virtue of the fact that the two are paired by way of the individual's transaction account). Server system 106 may compare the individual's saved identifying information (e.g., a saved secret gesture) to the identifying information presented/entered by the individual (e.g., a presented secret gesture). If server system 106 determines that the saved identifying information matches the entered/presented identifying information, server system 106 may authenticate the individual to his transaction account.

In an embodiment, an individual may decline to present his likeness, or he may discover that his likeness has changed sufficiently (perhaps the individual has aged) to prevent a match between the likeness presented for capture by the individual and the likeness saved by server system 106. In either event, an individual may be authenticated to his transaction account based upon an image of his transaction instrument and/or an account code associated with his transaction instrument and his identifying information. An individual may enter and/or present some or all of his identifying information (step 404) through a variety of input devices (e.g., mice, keyboards, cameras, and the like). Thus, and as described elsewhere herein, an individual may enter his PIN via a keyboard and/or mouse, and an individual may enter a digital signature by way of a stylus and electronic signature pad. Likewise, in an embodiment, an individual may present any of his PIN, digital signature, and/or secret gesture using the gesture based systems and methods described elsewhere herein. For example, an individual may present his digital signature by moving his marker in space along a path that corresponds to his signature. Likewise, an individual may present his PIN by moving his marker in space such that the icon associated with his marker and displayed by client 104 overlaps an electronic PIN pad, which the individual may use to enter or present his PIN, one digit at a time.

Irrespective of the method by which an individual enters/presents his identifying information, server system 106 may retrieve the individual's saved identifying information using the image of the individual's transaction instrument and/or entered account code to locate and retrieve the identifying information that it is paired to. Server system 106 may further compare the entered and/or presented identifying information to the paired identifying information. Where the entered/presented identifying information matches the paired identifying information, server system 106 may authenticate the individual to his transaction account and approve the requested transaction (step 406). Server system 106 may approve (or deny) a transaction itself, or server system 106 may forward a transaction request to a payment processor or payment processing system (not shown), which may approve (or deny) the transaction in accordance with a payment processing logic. Where an individual's presented/entered identifying information does not sufficiently match the paired identifying information, server system 106 (or other payment processing system) may determine that the individual may be engaged in fraudulent activity, in which case, server system 106 may (after a number of attempts by the individual to successfully enter/present his identifying information) decline to authenticate the individual to his transaction account and/or deny the requested transaction and/or report the transaction instrument/account to the transaction account issuer for further investigation (step 406).

Figure 5:
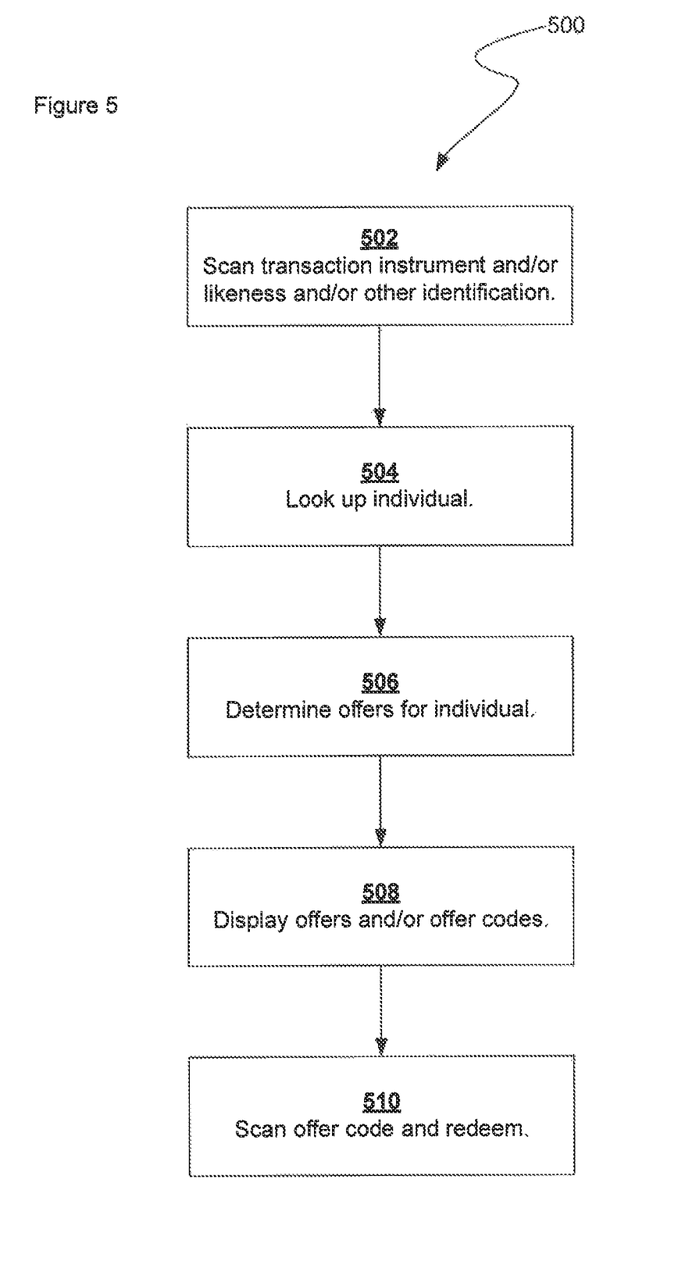
FIG. 5 shows a flowchart depicting an exemplary method for displaying offers using gesture-based systems, in accordance with an embodiment.

With reference to FIG. 5, a process 500 through which an individual may receive special offers is described. In an embodiment, an individual may enter a merchant location (i.e., a store) and/or sit or stand in front of a client 104. There, the individual's likeness may be scanned (step 502) by a camera 102 (or other biometric reader). An individual's transaction instrument, PIN, digital signature, and/or secret gesture may also be captured (but these options require the participation of the individual). Further, an individual may allow his marker (e.g., his transaction instrument and/or mobile communication device) to be scanned. In each instance, server system 106 may look up the individual's transaction account information (step 504), whereupon server system 106 may determine that a variety of special offers or discounts exist, or may be generated, with reference to the individual (step 506). In some instances, server system 106 may require authentication of an individual prior to transmitting an offer to the individual (e.g., where the offer comprises or is based upon private and/or personal information of the individual, and/or where the offer is transmitted to a public client 104, such as a digital sign or kiosk). Likewise, on other occasions, server system 106 may transmit an offer to an individual prior to authentication of the individual (e.g., where the over is not considered personal or sensitive, and/or where the offer is transmitted directly to the individual's mobile device 110 and or private client (e.g., a personal computer) 104).

Server system 106 may therefore transmit one or more offers to the individual by way of client 104 and/or mobile device 110 (step 508). Each offer may be accompanied by a code or identifier which, in certain embodiments, the individual may use to redeem the offer (step 510). For example, where an individual possesses a mobile communication device (e.g., a smart phone), the individual may scan, photograph, or accept a code (e.g., a QR code or a barcode) associated with the offer. The individual's mobile communication device may handle the processing of the transaction completely apart from any of the merchant's payment processing systems, and the individual may simply pick up the purchased item at the merchant's register or service counter. Systems and methods for processing transactions based upon QR codes are described in U.S. application Ser. No. 13/023,915, filed Feb. 9, 2011, which is hereby incorporated by reference.

With continuing attention to FIG. 5, in certain instances, an individual may not have in his possession a mobile device 110. In these instances, the individual may redeem the advertised offer at a register or POS terminal. For example, an individual, seeing an offer in which he has interest, may purchase the offered item or redeem the offered discount at a merchant's payment counter by presenting his transaction instrument. Server system 106 may identify the offers that were displayed for the individual, each of which may be displayed for the individual by way of a payment display, POS terminal, or the like. The individual may select the desired offer at the payment counter, and the transaction may be processed using the individual's transaction instrument (step 508). In an embodiment, an individual may not be required to select the offer in which he is interested because, for example, the item the individual is purchasing is only associated with a single offer. In this circumstance, server system 106 may automatically process the individual's transaction in association with the offer (step 508).

Figure 6:
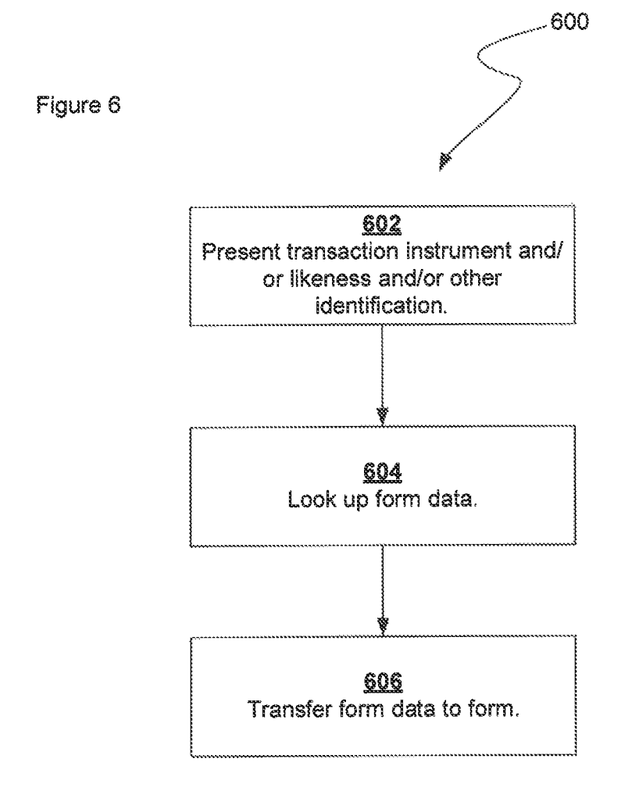
FIG. 6 shows a flowchart depicting an exemplary method for populating an online form using gesture-based systems, in accordance with an embodiment.

With reference to FIG. 6, a process 600 for automatically populating a web-based form using the systems and methods described herein is disclosed. In an embodiment, an individual may encounter an online or web-based form into which he must enter certain personal data (e.g., social security number, name and address, etc.). The individual may, at this point, leverage the systems and methods described herein such that the form is automatically populated by server system 106, client 104, and/or mobile device 110. For example, the individual may present his likeness and/or transaction instrument and/or mobile device 110 to camera 102 (or other biometric scanner/reader) (step 602). As described above, camera 102 may capture the individual's likeness and/or transaction instrument and/or mobile device 110, and transmit this data to client 104 and/or directly to server system 106 (i.e., where camera 102 is integral to mobile device 110). Client 104 may relay the captured data to server system 106. Server system 106 may use the captured data to look up a variety of personal information associated with the individual (assuming the individual has been satisfactorily validated to his transaction account, as described above) (step 604). Server system 106 and/or client 104 may transfer the individual's personal information into the form, releasing the individual from the necessity of entering the data himself (step 606). Similarly, where an individual would like to enter information into a form by way of his mobile device 110, server system 106 and/or client 104 may transfer the individual's personal information to mobile device 110, which information mobile device 110 may use to populate the form. Systems and methods for automatically populating web-based forms are described in U.S. patent application Ser. No. 11/860,645, filed Sep. 25, 2007, which is hereby incorporated by reference.

In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. After reading the description, it will be apparent to one skilled in the relevant art(s) how to implement the disclosure in certain embodiments.

In various embodiments, the methods described herein are implemented using the various particular machines described herein. The methods described herein may be implemented using the particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows NT, 95/98/2000, XP, Vista, OS2, UNIX, Linux, Solaris, MacOS, etc.) as well as various conventional support software and drivers typically associated with computers. A user may include any individual, business, entity, government organization, software and/or hardware that interact with a system.

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer, Mozilla Firefox, Google Chrome, Apple Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

As those skilled in the art will appreciate, a web client includes an operating system (e.g., Windows NT, 95/98/2000/CE/Mobile, OS2, UNIX, Linux, Solaris, MacOS, PalmOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In an exemplary embodiment, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In an embodiment, various components, modules, and/or engines of system 100 may be implemented as micro-applications or micro-apps. Micro-apps are typically deployed in the context of a mobile operating system, including for example, a Palm mobile operating system, a Windows mobile operating system, an Android Operating System, Apple iOS, a Blackberry operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The system contemplates uses in association with web services, utility computing, pervasive and individualized computing, security and identity solutions, autonomic computing, cloud computing, commodity computing, mobility and wireless solutions, open source, biometrics, grid computing and/or mesh computing.

Any databases discussed herein may include relational, hierarchical, graphical, or object-oriented structure and/or any other database configurations. Common database products that may be used to implement the databases include DB2 by IBM (Armonk, N.Y.), various database products available from Oracle Corporation (Redwood Shores, Calif.), Microsoft Access or Microsoft SQL Server by Microsoft Corporation (Redmond, Wash.), MySQL by MySQL AB (Uppsala, Sweden), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GRIT, AGREP, SQL, using a key field in the tables to speed searches, sequential searches through all the tables and files, sorting records in the file according to as known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first triple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/TEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the Ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, in one exemplary embodiment, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The system may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within an web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, Java, JavaScript, VBScript, Macromedia Cold Fusion, COBOL, Microsoft Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code En C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, machine, hardware, software or business. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any goods, services or information over any network having similar functionality described herein.

The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks. The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, upgraded software, a stand alone system, a distributed system, a method, a data processing system, a device for data processing, and/or a computer program product. Accordingly, the system may take the form of an entirely software embodiment, an entirely hardware embodiment, or an embodiment combining aspects of both software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to at least one of A, B, and C or at least one of A, B, or C is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the invention has been described as a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for," As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method, comprising:
    receiving, by a computer hardware system, a video corresponding to a transaction request, wherein the video includes a likeness of an individual associated with the transaction request and an image of a transaction instrument depicted by a display of a mobile device;
    determining, by the computer hardware system, identity information associated with the individual based on the likeness of the individual;
    detecting, by the computer hardware system, a transaction account code from the image of the transaction instrument depicted by the display of the mobile device;
    determining, by the computer hardware system, a transaction account associated with the transaction account code;
    detecting, by the computer hardware system, that, during the video, the individual used the transaction instrument to perform a gesture in which the mobile device is moved in a particular pattern;

retrieving, by the computer hardware system, saved identity information associated with the transaction account;

performing, by the computer hardware system, a comparison between the saved identity information and the identity information; and processing, by the computer hardware system, the transaction request based on the comparison and based on the gesture matching a stored gesture associated with the individual.

2. The method of claim 1, wherein processing the transaction request comprises transmitting, by the computer hardware system, an approval in response to the identity information matching the saved identity information.

3. An article of manufacture including a non-transitory computer-readable storage medium having instructions stored thereon that, in response to execution by a computer system, cause the computer system to perform operations comprising:

receiving a video corresponding to a transaction request, wherein the video includes a likeness of an individual associated with the transaction request and an image of a transaction instrument depicted by a display of a mobile device;

detecting, based on the video, that, during the video, the individual used the transaction instrument to perform a gesture in which the mobile device is moved in a particular pattern;

detecting a transaction account code from the image of the transaction instrument depicted by the display of the mobile device;

determining a transaction account associated with the transaction account code;

retrieving a saved likeness associated with the transaction account;

performing a comparison between the saved likeness and the likeness of the individual; and in response to the saved likeness matching the likeness and the gesture matching a stored gesture associated with the individual, authorizing the transaction request.

4. The article of manufacture of claim 3, wherein the display of the mobile device further depicts at least one of: an expiration date, a quick response (QR) code, or a bar code.

5. The article of manufacture of claim 3, wherein authorizing the transaction request comprises transmitting an approval of the transaction request.

6. A system comprising:

a processor; and a non-transitory memory having instructions stored thereon that, in response to execution by the processor, cause the processor to perform operations comprising:

receiving a video corresponding to a transaction request that includes a likeness of an individual and an image of a transaction instrument depicted by a display of a mobile device;

detecting that, during the video, the individual used the transaction instrument to perform a gesture in which the mobile device is moved in a particular pattern;

retrieving a saved likeness based on the video;

comparing the saved likeness to the likeness included in the video; and in response to the saved likeness matching the likeness and based on the gesture matching a stored gesture associated with the individual, authorizing the transaction request.

7. The system of claim 6, wherein the operations further comprise receiving the transaction request via a secure connection.

8. The system of claim 7, wherein authorizing the transaction request comprises transmitting an approval of the transaction request.

9. The method of claim 1, wherein the saved identity information comprises saved biometric data associated with the individual.

10. The method of claim 9, wherein the transaction request further comprises biometric data associated with the individual.

11. The method of claim 9, wherein the saved biometric data corresponds to a voice print of the individual, a fingerprint of the individual, a facial feature of the individual, an ear feature of the individual, a vascular pattern of the individual, a deoxyribonucleic acid (DNA) pattern of the individual, a hand geometry of the individual, an iris feature of the individual, a retinal feature of the individual, or a combination thereof.

12. The method of claim 1, further comprising receiving, by the computer hardware system, identifying information, wherein processing the transaction request is performed based on a comparison between the identifying information and saved identifying information associated with the transaction account.

13. The method of claim 12, wherein the identifying information comprises a personal identification number (PIN), a digital signature, or a combination thereof.

14. The method of claim 1, wherein processing the transaction request comprises, in response to the identity information failing to match the saved identity information, denying the transaction request.

15. The method of claim 1, wherein processing the transaction request comprises, in response to the identity information failing to match the saved identity information, requesting additional identifying information.

16. The system of claim 6, wherein the likeness comprises a representation of a feature associated with the individual, data associated with the individual, biometric data of the individual, a representation of a device that can be used to identify the individual, or a combination thereof.

17. The method of claim 1, wherein the identity information is received as part of the transaction request.

18. The method of claim 1, wherein the identity information is received after receiving the transaction request.

19. The method of claim 10, wherein processing the transaction request further based on the saved biometric data matching the biometric data included in the transaction request.

20. The method of claim 1, wherein receiving the transaction request includes receiving encrypted data associated with the individual; further comprising decrypting the encrypted data included in the transaction request.

* * * * *